April 3, 1962     S. O. JOHNSON ET AL     3,028,091
SIMULATOR
Filed Aug. 13, 1958     3 Sheets-Sheet 1

WITNESSES:

INVENTORS
Stanley O. Johnson and
Thomas E. Fairey.
BY
ATTORNEY

3,028,091
SIMULATOR

Stanley O. Johnson and Thomas E. Fairey, Pittsburgh, Pa., assignors, by mesne assignments, to the United States of America as represented by the United States Atomic Energy Commission
Filed Aug. 13, 1958, Ser. No. 754,773
3 Claims. (Cl. 235—184)

The present invention relates to simulating devices and more particularly to a device for simulating the buildup of certain isotopes of iodine and xenon caused by the fission of fissile material.

Whenever a neutronic chain reaction is produced using fissionable material, a number of adverse fission products are also produced. By adverse fission products it is meant that the fission products tend to absorb the neutrons produced in the chain reaction and thereby act to shut down the chain reaction. One of the more important adverse fission products is $Xe^{135}$. In fact, the buildup of xenon is a limiting factor in the sustaining of a chain reaction. As such, xenon buildup must be overridden by an excess of reactivity in the reaction or else the reaction will shut itself down. As is known approximately 95 percent of xenon produced by the fissioning of uranium is caused by radioactive decay of $I^{135}$ through the following reaction:

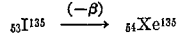

$Xe^{135}$ is also produced by direct fissioning of the uranium; however, such direct production is at most 5 percent of the total production of this isotope. Where a neutronic reactor is used, it is necessary to predict the amount of xenon which will be formed in order to determine whether the power level of the reactor may be varied in a certain manner. The formation of xenon will depend primarily upon the amount of iodine which will be formed in the reactor, and both of these quantities will depend upon the power history of the reactor for the previous 50 hours of operation. As is obvious to those skilled in the art, it is extremely important to predict the xenon formation, or else the possibility of reactor shutdown may exist.

To determine the basic iodine concentration equation it is noted that the quantity $\Sigma_f \phi$ is equivalent to the number of fissions per second taking place in the reactor, where $\Sigma_f$ denotes the miscroscopic fission cross section of the fissionable material in the reactor, and $\phi$ is the neutron flux in the reactor. The production rate of iodine or the number of atoms of iodine generated per second equals $$\gamma_I \Sigma_f \phi$$

where $\gamma_I$ denotes the fractional atom yield of iodine per fission of fissile material. The decay rate of iodine is equal to $$\lambda_I I$$

where $\lambda_I$ denotes the disintegration rate of iodine, and $I$ is the iodine concentration. Accordingly, the rate of change of the iodine concentration with time would be equal to the production rate of iodine minus the decay rate of iodine or $$\frac{dI}{dt} = \gamma_I \Sigma_f \phi - \lambda_I I \tag{1}$$

The basic xenon equation is $$\frac{dX}{dt} = \gamma_X \Sigma_f \phi + \lambda_I I - \lambda_X X - \sigma_X X \phi \tag{2}$$

where $X$ equals the xenon concentration; $\gamma_X$ is the fractional yield of xenon per fission of fissile material; $\lambda_X$ is the xenon disintegration constant; and $\sigma_X$ is the capture cross section of xenon. It is noted that the quantity $\gamma_X \Sigma_f \phi$ denotes the production rate of xenon through direct fissioning, $\lambda_X X$ is the rate of radioactive decay of xenon, and $\sigma_X X \phi$ denotes the neutron absorption rate of xenon. As iodine, by means of beta decay, becomes xenon, the decay rate of iodine is also included in the xenon equation. Accordingly, the xenon equation denotes that the rate of change of the xenon concentration with time is equal to the amount of xenon produced directly by fissioning plus the amount of xenon produced through the beta decay of iodine minus the xenon decay rate minus the neutron absorption rate of xenon.

It is to be noted that in Equations 1 and 2 the quantity $\Sigma_f$ varies from reactor to reactor, and it is to be further noted that the quantity $\sigma_X$ would differ for a fast reactor as compared to a thermal reactor. Accordingly, it is desirable to include all varying constants in the variable of the equations, and Equations 1 and 2 should be normalized to do so. As we are presently interested in reactors only in the thermal neutron range, for purposes of illustration, it will be unnecessary to normalize the quantity $\sigma_X$, but it would be preferable to normalize the equations to include $\Sigma_f$ in the variable so that the resulting equations will be independent of different types of thermal reactors. It is, of course, to be noted that the equations may be normalized again to include the quantity $\sigma_X$ only in the variable.

To normalize Equations 1 and 2 each of the equations are multiplied by the quantity $$\frac{\sigma_X}{\Sigma_f}$$

Equation 1 becomes $$\frac{d}{dt}\left(\frac{\sigma_X I}{\Sigma_f}\right) = \gamma_I \sigma_X \phi - \frac{\lambda_I I \sigma_X}{\Sigma_f} \tag{3}$$

and Equation 2 becomes $$\frac{d}{dt}\left(\frac{\sigma_X X}{\Sigma_f}\right) = \gamma_X \sigma_X \phi + \frac{\lambda_I \lambda_X I}{\Sigma_f}$$

$$\frac{\lambda_X \sigma_X X}{\Sigma_f} - \frac{\sigma_X^2}{\Sigma_f} X \phi \tag{4}$$

letting $$I' = \frac{\sigma_X I}{\Sigma_f} \text{ and } X' = \frac{\sigma_X X}{\Sigma_f}$$

Equations 3 and 4 now become $$\frac{dI'}{dt} = \gamma_I \sigma_X \phi - \lambda_I I' \tag{5}$$

and $$\frac{dX'}{dt} = \gamma_X \sigma_X \phi + \lambda_I I' - \lambda_X X' - \sigma_X X' \phi \tag{6}$$

Accordingly, Equations 5 and 6 denote the rate of change of iodine concentration and the rate of change of xenon concentration respectively independently of the thermal reactors used.

The present invention relates to a simulator for simulating the rate of change of iodine concentration and the rate of change of xenon concentration with time. There is provided an electronic circuit having an iodine concentration indicator and a xenon concentration indicator therein. After the previous 50 hour power history of the reactor is imposed upon the circuit, the desired future operating characteristics of the reactor are then imposed, and the indicating means will point out the iodine and the xenon buildup due to such future operation. The simulating device is constructed with its own power supply wherein it is made portable. It is to be noted that the simulator circuit comprises merely resistance and capacitance elements therein for simulating equations 5 and 6. There is also provided a pair of pentodes in the simulator circuit which are connected therein to form cathode follower amplifiers and which operate to match the impedance of one part of the simulator circuit with the other and which further act to isolate portions of the simulator circuit.

Accordingly, it is a primary object of this invention to provide novel simulator means for simulating a pair of dependent first order differential equations.

It is another object of this invention to provide novel means for predicting the buildup in iodine concentration and xenon concentration in a neutronic reactor in accordance with the power history of the reactor.

For a more complete understanding of the invention reference may be had to the following description thereof and to the accompanying drawings in which.

Figure 1:
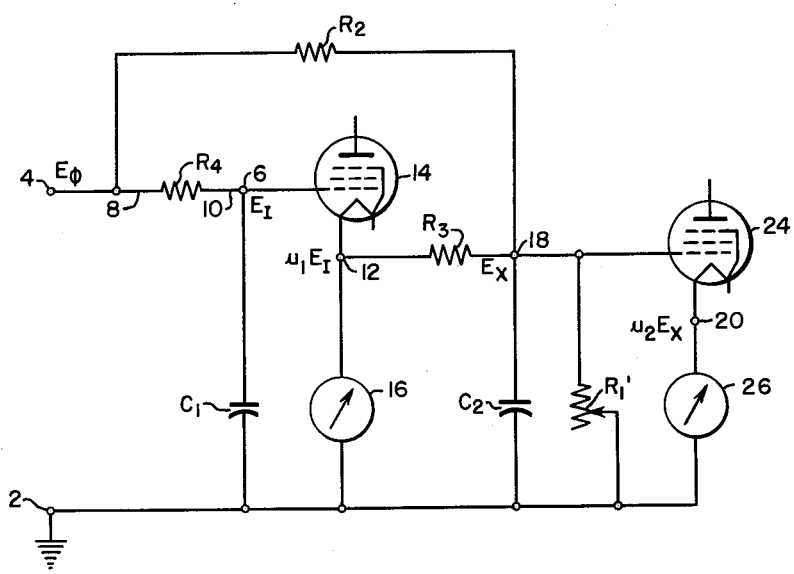
FIGURE 1 is a schematic diagram of a circuit having outputs therein which simulate the iodine and xenon concentrations in a neutronic reactor.

Referring to FIG. 1, there is provided a pair of terminals 2 and 4 across which a voltage source $E_\phi$ is imposed. The voltage $E_\phi$ is representative of the neutron flux in the reactor and, as the flux is proportional to the power level of the reactor, $E_\phi$ is also representative of the power level of the reactor. The terminal 2 is connected to ground, and the terminal 4 is provided with the voltage $E_\phi$ relative to terminal 2. The simulating circuit comprises a resistor $R_4$ connected directly to terminal 4 by means of conductor 8. The resistor $R_4$ is connected to a circuit node 6 by means of a conductor 10. There is provided a capacitor $C_1$ which is connected between the node 6 and the terminal 2, and the node 6 is connected to a node 12 through an amplifier 14. The node 12 is connected to the ground terminal 2 through a recording device 16, and the node 12 is further connected to a node 18 through a resistor $R_3$. The node 18 is connected to terminal 4 through a resistor $R_2$ and is also connected to ground terminal 2 through a parallel circuit comprising a condenser $C_2$ in parallel with a variable resistor $R_1'$. The node 18 is connected to another circuit node 20 through a second amplifier 24, and the node 20 is connected to ground terminal 2 through a second recording device 26.

It can, therefore, be seen that the combination of the resistor $R_4$ and the condenser $C_1$ form a first integrating circuit whose output is supplied to the amplifier 14. The combination of resistors $R_2$, $R_3$ and $R_1'$ with the condenser $C_2$ comprises a second integrating circuit whose inputs are the voltages $E_\phi$ and the output of the amplifier 14. The output of the second integrating circuit is fed into the amplifier 24. The recording devices 16 and 26 indicate the outputs of the first and second integrating circuits, respectively.

Computing the currents at the node 6 it is supposed that a voltage $E_I$ is impressed at the node 6. Accordingly, the current flowing into node 6 from terminal 4 is $$\frac{E_\phi - E_I}{R_4}$$

The current flowing away from node 6 through condenser $C_1$ to ground terminal 2 is equal to $$C_1 \frac{dE_I}{d\tau}$$

The amplifier 14 is devised so that it draws negligible current from node 6 and may, therefore, comprise an electronic tube such, for example, as a pentode wherein node 6 is connected to the control grid thereof as will be more fully described hereinafter. Accordingly, totalizing the incoming and outgoing currents at node 6 results in the equation $$\frac{E_\phi - E_I}{R_4} - C_1 \frac{dE_I}{d\tau} = 0$$

where $\tau$ equals the simulator time. Rearranging the above equation:

$$\frac{dE_I}{d\tau} = \frac{1}{C_1 R_4} E_\phi - \frac{1}{C_1 R_4} E_I \qquad (7)$$

Computing the incoming and outgoing currents at node 18 with the supposition that a voltage $E_X$ exists at node 18, the following equation results:

$$\frac{E_\phi - E_X}{R_2} + \frac{\mu_1 E_I - E_X}{R_3} - \frac{E_X}{R_1'} - C_2 \frac{dE_X}{d\tau} = 0$$

Rearranging the above equation $$\frac{dE_X}{d\tau} = \frac{1}{C_2 R_2} E_\phi - \frac{1}{C_2 R_2} E_X + \frac{\mu_1 E_I}{C_2 R_3} - \frac{1}{C_2 R_3} E_X - \frac{E_X}{C_2 R_1'} \qquad (8)$$

It is to be noted that Equation 7 is in the form of Equation 5, and that Equation 8 is in the form of Equation 6. It is to be further noted that the voltage at node 12 will be proportional to the voltage at node 6 with the amplification factor $\mu_1$ of amplifier 14 as the constant of proportionality. Accordingly, the voltage across the recorder 16 will vary according to Equation 7. It is to be similarly noted that the voltage at node 20 is proportional to the voltage at node 18 with the constant of proportionality being the amplification factor $\mu_2$ of the amplifier 24. Therefore, the voltage across the recording device 26 will vary as Equation 8.

Figure 2:
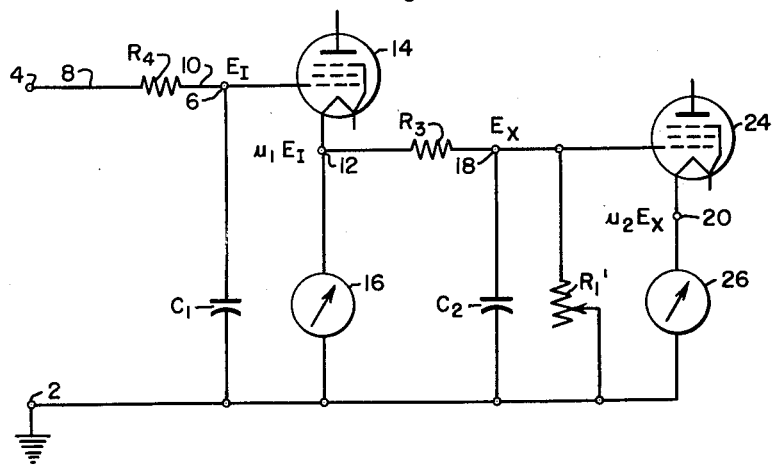
FIG. 2 is a schematic diagram of a circuit similar to the circuit shown in FIG. 1 and having certain components thereof eliminated in order to provide a more operable circuit.

It is to be noted that FIG. 2 differs from FIG. 1 in that in FIG. 1 the circuit is provided with a resistor $R_2$ between the terminal 4 and node 18. Accordingly, like parts of FIG. 2 will be referenced with the same reference characters used in FIG. 1. The circuit represented in FIG. 2 also comprises a first integrating circuit provided by the resistor $R_4$ and the condenser $C_1$. The second integrating circuit of FIG. 2 is comprised only of the resistors $R_3$ and $R_1'$ and the condenser $C_2$. Thus, the input to the second integrating circuit is merely the output of the amplifier 14.

The resistor $R_2$ is provided to represent the xenon produced directly from fissioning of the fissile material. As the direct production of xenon from the fissioning of $U^{235}$ is merely five percent of the total xenon concentration, the elimination of resistor $R_2$ will create at most a five percent error in the xenon concentration. A better approximation yielding even less than a five percent error is that all of the xenon produced comes from the decay of iodine. As such $\gamma_X'$ is considered to be zero and:

$$\gamma_I' = \gamma_X + \gamma_I \qquad (9)$$

The latest known values for $\gamma_X$ and $\gamma_I$ are:

$$\gamma_X = 0.003$$
$$\gamma_I = 0.060$$

Accordingly, using the above equation, $$\gamma_X' = 0$$

and $$\gamma_I' = 0.063$$

Substituting this approximation into the simulated circuit will result in the value of resistors $R_2$ to be infinitive. Letting $\mu_1 = 1$, Equations 5, 6, 7, and 8, respectively, become $$\frac{dI'}{dt} = \gamma_I' \sigma_X \phi - \lambda_I I' \qquad (10)$$

$$\frac{dX'}{dt} = \lambda_I I' - \lambda_X X' - \sigma_X X' \phi \qquad (11)$$

$$\frac{dE_\mathrm{I}}{d\tau} = \frac{1}{C_1 R_4} E_\phi - \frac{1}{C_1 R_4} E_\mathrm{I} \qquad (12)$$

$$\frac{dE_\mathrm{X}}{d\tau} = \frac{1}{C_2 R_3} E_\mathrm{I} - \frac{1}{C_2 R_3} E_\mathrm{X} - \frac{1}{C_2 R_1'} E_\mathrm{X} \qquad (13)$$

The coefficients of Equations 12 and 13 are chosen to satisfy the following relationships:

$$C_1 R_4 = \frac{K_\tau}{\lambda_\mathrm{I}},$$

$$C_2 R_1' = \frac{K_\tau}{\sigma_\mathrm{X} \phi},$$

$$C_2 R_3 = \frac{K_\tau}{\lambda_\mathrm{X}}$$

and $$K_\tau = \frac{\tau}{t} \qquad (14)$$

where $t$ equals real time and $\tau$ represents simulator time.

Accordingly, using the above approximation, the node equations for the circuit shown in FIG. 2 are represented by Equations 12 and 13 with the scaling relationships of Equation 14. The above approximation, however, appears to lead to an improper iodine concentration. It is to be noted that since the effect appears only in one of the scaling relationships of Equation 14, the error in iodine concentration can be eliminated by merely calibrating the output measuring device 16 which indicates the iodine concentration.

A problem is encountered with respect to the variation of resistor $R_1'$. From the scaling relationships of Equation 14, it is to be noted that:

$$R_1' = \frac{K_\tau}{\sigma_\mathrm{X} \phi C_2}$$

hence, resistor $R_1'$ varies inversely with the flux $\phi$. As continuous variation of resistor $R_1'$ is difficult to obtain, it is to be noted that sufficient accuracy can be obtained by varying the flux $\phi$ in 10 percent steps from 0 to 100 percent. In this case, $$R_1' = \frac{K_\tau}{\sigma_\mathrm{X} C_2 \phi_\mathrm{max}} \cdot \frac{\phi_\mathrm{max}}{\phi}$$

where $\phi_\mathrm{max}$ is the flux value at 100 percent power and is obtained by varying the value of the voltage $E_\phi$ on the simulator. Resistor $R_1'$ is made up of a plurality of sets of resistors connected in a string, with a rotary selector switch to select the proper value. It is to be noted that the 100 percent power flux value varies from core to core and also with the lifetime of any one core. Hence, a provision must be made to impose upon the simulator the maximum value of the flux $\phi$ at 100 percent power. The present invention provides means for varying the value of the resistor $R_1'$ and accordingly, the flux $\phi$ from $1 \cdot (10^{13})$ to $31 \cdot (10^{13})$ by paralleling the proper strings of resistors corresponding to each $\phi_\mathrm{max}$.

The variation of the flux $e_\phi$ is obtained from a string of equal value resistors across which a direct current voltage is applied. The switching is performed by a 6-pole, 11 position circuit switch calibrated in 10 percent power steps from 0 to 100 percent power.

For computation of the time scale between computer time $\tau$ and real time $t$, a convenient time scale for an operation of the simulator and for ease in calibrating, is one minute of computer time to be equal to ten hours of real time. Hence, the value of $K_\tau$ may be so obtained. From the scaling relationships, the values of the resistors and condensers used in the simulator may easily be calculated.

Figure 3A:
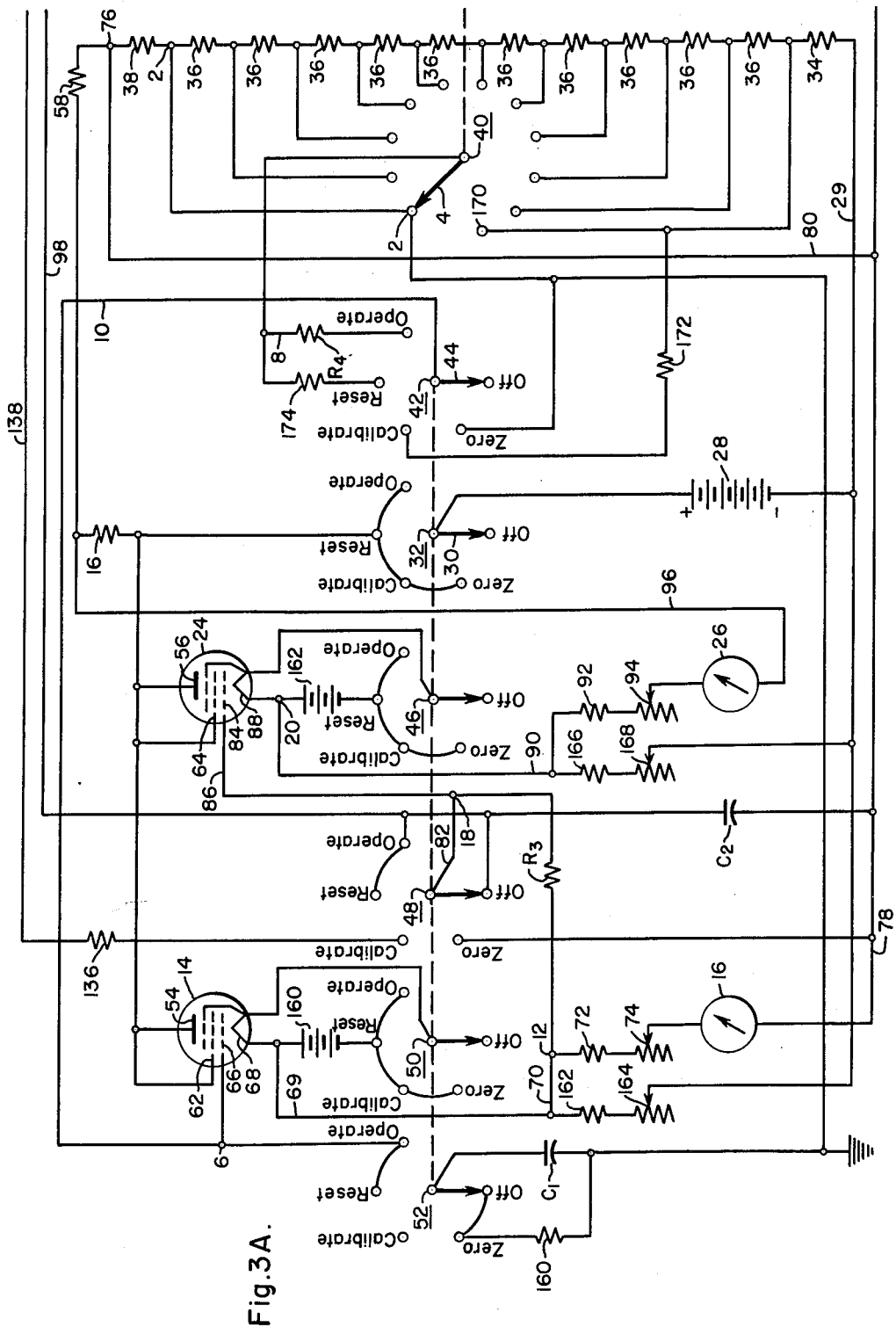
FIGS. 3a and 3b comprise a line diagram including all components necessary to complete the circuit shown in FIG. 2.
Figure 3B:
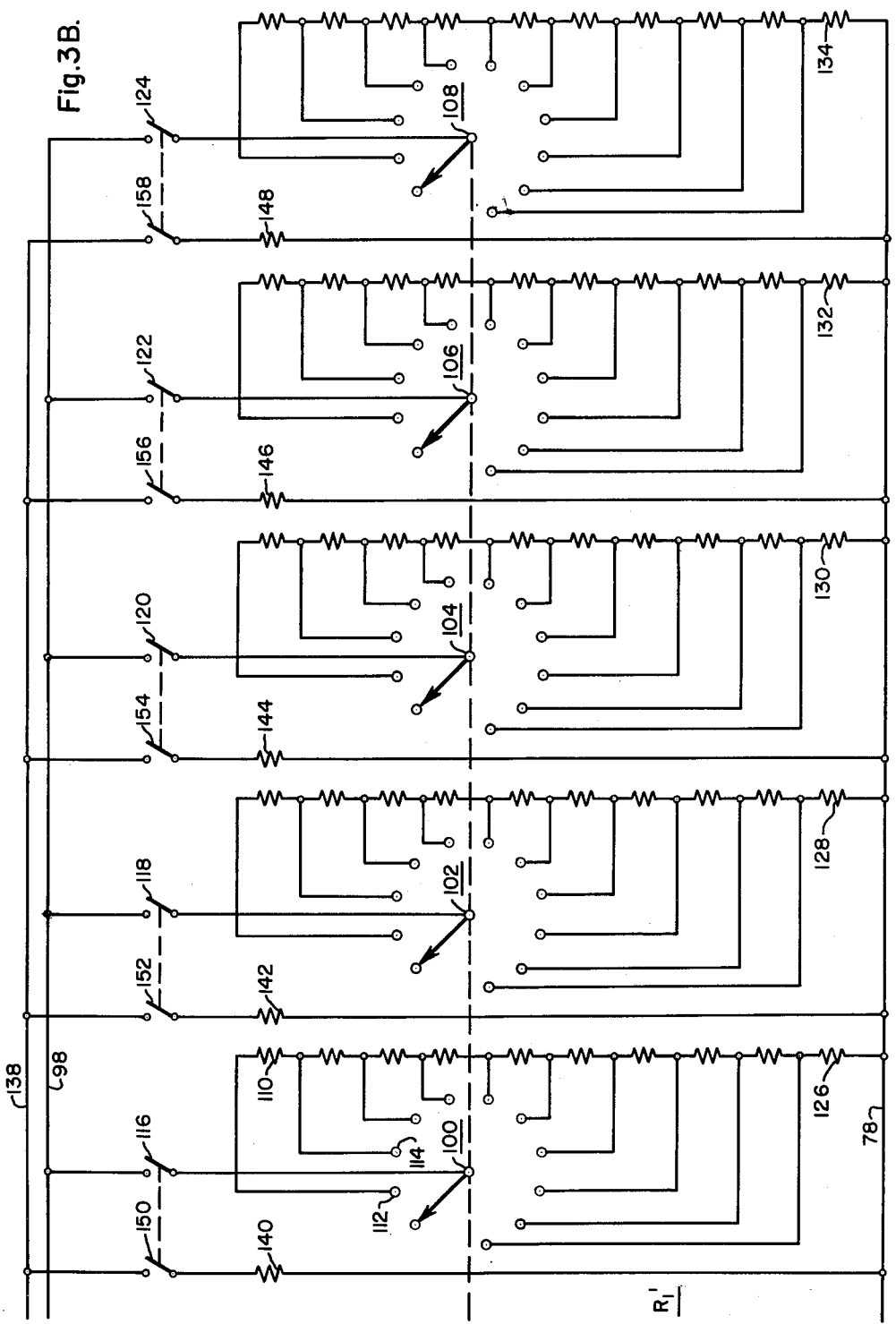

Reference is now made to FIGS. 3a and 3b which, when placed end-to-end, comprise the complete operating circuit for the simulator circuit shown in FIG. 2. Accordingly, like parts of FIGS. 2 and 3 will be numbered identically. To obtain the voltage $E_\phi$ across the input terminals 2 and 4, there is provided a direct current anode voltage source 28 having its positive terminal connected to the movable contact 30 of a selector switch 32. The negative terminal of the voltage source 28 is connected to ground terminal 2 through a string of series connected resistors 34 and 36 by a conductor 29. The positive terminal of the voltage source 28 is also connected to ground terminal 2 through the switch 32 and series connected resistors 16, 58 and 38. Accordingly, the potential of the voltage source 28 is connected across the string of series connected resistors 34, 36, 38, 58 and 16 through the selector switch 32. Each of the resistors 36 are connected to fixed contacts of a voltage dividing switch 40, so that the switch 40 operates to divide the voltage of the source 28. Plate voltage is supplied to the anodes 54 and 56 of amplifiers 14 and 24, respectively, from the source 28 through the selector switch 32. The selector switch 32 is mechanically connected to other selector switches 42, 46, 48, 50 and 52, each of which comprises a 5-pole switch having an off position, a zero position, a calibrate position, a reset position and an operate position. The amplifiers 14 and 24 are arranged to comprise cathode follower amplifiers and a pentode is utilized for each amplifier wherein the outputs thereof are taken from the cathode.

One fixed contact of the voltage divider switch 40 comprises a ground terminal 2 and is connected to the anodes 54 and 56 of amplifiers 14 and 24, respectively, through series connected resistors 38, 58 and 16. The suppressor grid 62 of amplifier 14 is connected to the anode 54 thereof and the suppressor grid 64 of amplifier 24 is connected to the anode 56 thereof.

For purposes of illustration, it is now supposed that the movable contacts of switches 32, 42, 46, 48, 50 and 52 are in operate position.

The positive terminal of the anode voltage source 28 is connected to the anodes 54 and 56 of amplifiers 14 and 24, respectively, through the switch 32. The movable contact of the voltage divider switch 40 is moved to an appropriate position representative of the percentage of full power of the reactor being simulated and the movable contact of the voltage divider switch 40 is at potential $E_\phi$ which is illustrated as terminal 4 on FIG. 3. Thus, the voltage $E_\phi$ is imposed across terminal 4 and the terminal 2 which also comprises a contact of the voltage divider switch 40. Tracing the circuit of FIG. 3 it can be seen that FIG. 3 basically comprises the simulator circuit of FIG. 2. The voltage $E_\phi$ is imposed from terminal 4 to the resistor $R_4$ which is connected to terminal 4 through conductor 8. Resistor $R_4$ is connected to node 6 of the simulator through the switch 42 and conductor 10. Node 6 is connected to the control grid 66 of the amplifier 14 and is also connected to the operate position of the selector switch 52. The movable contact of the selector switch 52 is connected to ground through the condenser $C_1$. The cathode 68 of the amplifier 14 is connected to node 12 of the circuit by means of conductors 69 and 70 and node 12 is connected to a series circuit comprising a resistor 72, a calibrating potentiometer 74, and a recording device 16 which is illustrated to comprise an ammeter. The recording device 16 is connected to a circuit junction 76 through conductors 78 and 80 and the circuit junction 76 is connected to the ground terminal 2 through the resistor 38. The node 12 is also connected to one side of the resistor $R_3$ and the other side of resistor $R_3$ is connected to the node 18. The node 18 is connected to the movable contact of the selector switch 48 through conductor 82 and the operate contact of the selector switch 48 is connected to the conductor 78 through the condenser $C_2$. The node 18 is also connected to the control grid 84 of the amplifier 24 through conductor 86. The cathode 88 of the amplifier 24 is connected to the node 20 and the latter is connected ot the ground terminal 2 through conductor 90, resistor 92, calibrating potentiometer 94, recording device 26, conductor 96, and resistors 58 and 38, respectively. The variable resistor $R_1'$ is connected across condenser $C_2$ as the former has one side thereof connected to the operate position of the switch 48 through conductor 98, and the other side of variable resistor $R_1'$ is connected to conductor 78. Accordingly, the basic circuit shown in FIGS. 3a and 3b is substantially the circuit shown in FIG. 2. A number of slight modifications are made in FIGS. 3a and 3b whereby a plurality of fixed resistors are located in the circuit particularly to maintain the amplifiers 14 and 24 in the linear range. The resistors 16 and 34 are particularly incorporated for this purpose and the resistors 38 and 58 are provided to bias the cathodes of the amplifiers 14 and 24 with a positive voltage with respect to the control grids 66 and 84 thereof when zero voltage is applied, whereby minimum grid current is insured.

It is to be noted that while the recording device 16 comprises an ammeter, the combination of the ammeter and the resistor 72 and the calibrating potentiometer 74 provides an output reading by the ammeter corresponding to the voltage across node 12 and the circuit junction 76.

The variable resistor $R_1'$ comprises a network of resistors which are connected across the fixed terminals of five selector switches 100, 102, 104, 106 and 108, for example, the resistor 110 is connected across the terminals 112 and 114 of the switch 100. The switches 100, 102, 104, 106 and 108 are mechanically connected to the voltage divider switch 40 so that movement of the movable contact of the voltage divider switch 40 also moves the movable contacts of the other switches. The movable contacts of the switches 100, 102, 104, 106 and 108 are connected to the conductor 98 through switches 116, 118, 120, 122, and 124, respectively. One of the fixed contacts of each of the switches 100, 102, 104, 106, 108 is connected to the conductor 78 through resistors 126, 128, 130, 132, and 134, respectively. The variable resistor $R_1'$ additionally includes a resistor 136 having one side thereof connected to the calibrate position of switch 48 and having the other side thereof connected to conductor 138. Conductor 138 is connected to conductor 78 through paralleled resistors 140, 142, 144, 146 and 148 and switches 150, 152, 154, 156, and 158, respectively. The switches 150, 152, 154, 156 and 158 are mechanically connected to the switches 116, 118, 120, 122 and 124, respectively, so that the resistors 140, 142, 144, 146 and 148 are in the circuit only when their associated switches are closed.

Thus, it may be seen that the variable resistor $R_1'$ is connected in parallel with condenser $C_2$ as the resistor network associated with switches 100, 102, 104, 106 and 108 are each connected across the conductors 98 and 78. Each of the resistors in the resistance network which comprises the variable resistor are $R_1'$ is calculated to have a value whereby when switch 116 is closed the resistance across the conductors 98 and 78 is of a value which corresponds to a neutron flux $\phi$ which varies between $$0 \text{ to } 1 \times 10^{13} \frac{\text{neutrons}}{\text{second}-\text{cm.}^2}$$

depending upon the position of the movable contact of the switch 100. Similarly, the resistors associated with the switch 102 are provided with values which correspond to neutron fluxes which vary from $$0 \text{ to } 2 \times 10^{13} \frac{\text{neutrons}}{\text{second}-\text{cm.}^2}$$

The resistors associated with the selector switch 104 are provided with values which correspond to a neutron flux which varies from $$0 \text{ to } 4 \times 10^{13} \frac{\text{neutrons}}{\text{second}-\text{cm.}^2}$$

The resistors associated with selector switch 106 are provided with values which correspond to neutron fluxes varying from $$0 \text{ to } 8 \times 10^{13} \frac{\text{neutrons}}{\text{second}-\text{cm.}^2}$$

and the resistors associated with selector switch 108 are provided with values which correspond to neutron flux levels which vary from $$0 \text{ to } 16 \times 10^{13} \frac{\text{neutrons}}{\text{second}-\text{cm.}^2}$$

It can, therefore, be seen that by properly opening or closing the switches 116, 118, 120, 122 and 124, maximum neutron fluxes from $$1 \times 10^{13} \text{ to } 31 \times 10^{13} \frac{\text{neutrons}}{\text{second}-\text{cm.}^2}$$

can be imposed across the conductors 78 and 98. Accordingly, any neutron flux between $$0 \text{ and } 31 \times 10^{13} \frac{\text{neutrons}}{\text{second}-\text{cm.}^2}$$

may be imposed on the simulator.

Each of the cathodes 68 and 88 of the amplifiers 14 and 24, respectively, are heated by separate voltage sources 160 and 162, respectively. The positive terminal of the voltage source 160 is connected directly to one side of the cathode 68 and the negative terminal of the voltage source 168 is connected to the reset position of the switch 50.

It is to be noted that the zero, calibrate, reset, and operate positions of the switch 50 are interconnected. The movable contact of the switch 50 is conneced to the other side of the cathode 68 so that heating voltage is applied to the cathode 68 whenever the switch 50 is in the zero, calibrate, reset, or operate positions. Similarly, the positive terminal of the voltage source 162 is connected directly to one side of the cathode 88 and the negative terminal of the voltage source 62 is connected to the zero, calibrate, reset, and operate positions of the switch 46. The movable contact of the switch 46 is connected directly to the other side of the cathode 88.

It is to be further noted that the zero, calibrate, reset and operate positions of the switch 32 are connected. In this manner plate voltage is applied to the amplifiers 14 and 24 from the plate voltage source 28 at all positions of the switch 32 except the off position. Heating voltage is similarly applied to the cathodes of the amplifiers 14 and 24 at all positions of the switches 50 and 46, respectively, except the off positions thereof.

The zero and off positions of the switch 52 are conected and there is provided a resistor 160 having one side thereof connected to the zero position of the switch 52 and the other side thereof connected to ground whereby the condenser $C_1$ may be discharged through the resistor 160 whenever the switch 52 is at the off or the zero position. The reset and operate positions of the switch 52 are also connected so that the condenser $C_1$ is connected to the node 6 whenever the switch 52 is in either of these positions.

The following comprises a description of the operation of the simulator starting from the off position. It is first necessary to fix the zero positions of the recording devices 16 and 26. Accordingly, the switches 52, 50, 48, 46, 32, and 42 are moved to the zero position. Plate voltage is supplied to the amplifiers 14 and 24 from the plate voltage source 28 through the switch 32. Cathode bias voltage is supplied to the cathodes 68 and 88 of the amplifiers 14 and 24 through the switches 50 and 46, respectively. Condenser $C_1$ remains discharged by the resistor 160 by means of switch 52. The movable contact 4 of the switch 40 is connected to the fixed contact thereof corresponding to zero power and which comprises the ground terminal 2. Accordingly, a voltage $E_\phi$ equal to zero power is imposed across the terminals 2 and 4 of the simulator. It will be noted that the conductor 69 is connected to the conductor 29 through a fixed resistance 162 and a zeroing potentiometer 164 which are connected in series. The resistive value of the zeroing potentiometer 164 is then varied until the recording device 16 reads zero output.

The conductor 90 is also connected to the conductor 29 through a fixed resistor 166 and another zeroing potentiometer 168, and the resistive value of the zeroing potentiometer 168 is varied until the recording device 26 reads zero.

The next step is to calibrate the recording devices 16 and 26 to read full scale when the voltage $E_\phi$ imposed across terminals 2 and 4 corresponds to 100 percent of the reactor power. The maximum flux obtainable in the reactor at 100 percent power must be known to the operator. As the maximum flux in a neutronic reactor usually varies between $1 \times 10^{13}$ and $31 \times 10^{13}$ the flux corresponding to the full power operation of the reactor is imposed across the conductors 98 and 78 by the opening or closing of the switches 116, 118, 120, 122, and 124. For example, if the maximum flux and the reactor is $27 \times 10^{13}$ at 100 percent power the switches 116, 118, 122, and 124 are closed and the switch 120 is kept open. The terminal 170 of the voltage divider 40 corresponding to 100 percent power is connected to the calibrate position of the switch 42 through a resistor 172. Thus, full power is applied to the control grid 66 of the amplifier 14 as the movable contact 44 of the selector switch 42 is connected to the node 6 through the conductor 10. The output of the recording device 16 is varied to read full scale by varying the resistance of the calibrating potentiometer 74. Thus, the full scale reading of the iodine concentration at 100 percent power is obtained and the approximation made in the simulator circuit is compensated for. It is to be noted that little current is drawn by the amplifier 14 so that the calibration of the recording device 16 will not be adversely effected thereby.

Calibration of the recording device 26 is accomplished by applying a voltage to the control grid 66 of the amplifier 14 corresponding to the equilibrium iodine concentration. A signal is applied to the control grid 84 of the amplifier 24 equal to the maximum voltage obtained during a peak xenon transient. The peak xenon transient is defined as the amount of xenon produced when the power of the reactor is reduced stepwise to zero after reaching equilibrium at full power. The signal applied to the control grid 84 of the amplifier 24 is accomplished by substituting a proper combination of the resistors 136, 140, 142, 144, 146 and 148 for the variable resistor $R_1'$. It is to be noted that the condenser $C_2$ is not in the circuit when the calibration is taking place. As pointed out previously, the switches 150, 152, 154, 156 and 158 are mechanically connected to the switches 116, 118, 120, 122 and 124, respectively. Accordingly, by closing the switches 116, 118, 122 and 124 the switches 150, 152, 156 and 158 are also closed whenever the resistors 140, 142, 146 and 148 are connected in parallel across the conductors 138 and 78. Each of the resistors 140, 142, 144, 146, and 148 are calibrated to simulate the maximum xenon concentration occurring during the peak transient. Thus, a particular potential difference is applied across the conductors 138 and 78. As previously pointed out, the conductor 138 is connected to the calibrate position of the switch 48 through the resistor 136. The voltage on the calibrate position of the switch 48 is imposed directly upon the control grid 84 of the amplifier 24 through the switch 48, conductor 82 and conductor 86, respectively, whereby the signal corresponding to the maximum xenon concentration during a peak transient is applied directly to the control grid of the amplifier 24. A full scale output of the recording device 26 is obtained by varying the resistive value of the calibrating potentiometer 94.

The simulator circuit is also provided with a reset position which enables operation of the simulator at a faster time by charging the condenser $C_2$ more rapidly. When in the reset position, the simulator is substantially in the operate position except that the resistor $R_4$ is not in the circuit. The switch 42 in the reset position imposes a resistor 174 between the terminal 4 and the node 6 rather than the resistor $R_4$. The resistive value of the resistor 174 is made less than the value of the resistance $R_4$ whereby the condensers $C_1$ and $C_2$ are more rapidly charged thereby allowing the voltage $E_1$ to rise rapidly.

As previously pointed out, in order to determine the xenon and iodine that will be built up in a reactor when certain feature operation conditions are imposed thereon, it is necessary to first impose the operating conditions of the reactor for the previous 50 hours of operation. For example, it is supposed that for the last 50 hours the reactor operated as follows: 10 percent of power for 15 hours, 30 percent power for 10 hours, 100 percent power for 8 hours, and zero power for the remaining 17 hours. It is further supposed that the reactor will now be operated for 10 hours at 40 percent power and 1 hour at 100 percent power.

The simulator is turned on having already been zeroed and calibrated. The resistance $R_1'$ has been varied to a predetermined value corresponding to flux of the reactor at 100 percent power, in the manner previously described. The voltage divider 40 is turned to a position corresponding to 10 percent power. The switches 42, 32, 46, 48, 50, and 52 are turned to the reset position and the operator waits for a few minutes until the outputs of the recording devices 16 and 26 cease to increase. The switches 42, 32, 46, 48, 50 and 52 are turned to the operate position. Using the ratio of real time to simulated time previously mentioned, the voltage divider 40 is turned to the position corresponding to 10 percent power and kept at that position for 1.5 minutes. The voltage divider 40 is then turned to a position corresponding to 30 percent power and kept for that position for 1.0 minute. When the latter times have elapsed, the voltage divider 40 is turned so that the movable contact 4 engages the fixed contact 170 corresponding to 100 percent power and the movable contact 4 is kept in that position for 0.8 minute. The movable contact 4 of the voltage divider 40 is now turned to the position where it engages the fixed contact 2 corresponding to zero power and is kept there for 1.70 minutes. At this point the power history of the reactor has been fed into the simulator. The future operating characteristics of the operator will now be fed into the simulator by turning the movable contact 4 of the voltage divider 40 to the position corresponding to 40 percent power and keeping it there for 1.0 minute. The movable contact 4 of the voltage divider 40 is then moved to engage the fixed contact 170 corresponding to 100 percent power and is kept there for 0.1 minute. While the future operating characteristics are being fed into the simulator, the movement of the recording device 26 is noted and the peak xenon buildup is recorded. The operator compares this with the amount of excess reactivity contained in the reactor and determines whether or not the reactor can be operated in the desired manner without causing a shutdown of the neutron chain reaction.

It can, therefore, be seen that the analog circuit used in the simulator, unlike most dynamic analog computers uses no amplifiers. The dynamic behavior of the circuit is due to the electrical behavior of the passive networks. The cathode follower amplifiers are used merely as impedance matching devices; hence, the simulator is exceptionally stable when compared to dynamic high-gain direct current amplifiers. It is to be noted that the resulting simulator circuit is quite simple and has very low power requirements which enable this device to be small, portable, self-containing and inexpensive.

Since numerous changes may be made in the above-described construction and different embodiments of the

We claim as our invention:

1. An analog circuit comprising a first series resistor-capacitor integrating network, a variable direct current voltage source connected in shunt with said first network, a second series resistor-capacitor integrating network, means for coupling the capacitor of said first network in shunt with said second network, a variable resistor coupled in shunt with the capacitor of said second network, and indicating means connected in shunt with the capacitor of each of said first and second networks for producing indications of the values of the output signals thereof.

2. The analog circuit as recited in claim 1 comprising, in addition, means coupled to said voltage source and said variable resistor for decreasing the resistance of said variable resistor as the input voltage is increased.

3. In an analog device for measuring the buildup of xenon in a neutronic chain reactor, a first integrating circuit of a series resistor $R_4$ and capacitor $C_1$, a direct current voltage source connected across said first circuit and having a voltage output V proportional to the reactor power, a second integrating circuit of a series resistor $R_3$ and capacitor $C_2$, a variable resistor $R_1'$ connected in parallel with the capacitor $C_2$, said second integrating circuit being coupled across the output of said first integrating circuit, means for providing an inverse relationship between the voltage of said source and said variable resistor and indicating means connected to the output of second integrating circuit for indicating the amount of xenon built up in said reactor, the parameters of said integrating circuits being selected to have the following relationship to the parameters of the reactor:

$$C_1 R_4 = \frac{K_\tau}{\lambda_I}, \quad C_2 R_1' = \frac{K_\tau}{\sigma_X \phi}, \quad C_2 R_3 = \frac{K_\tau}{\lambda_X} \text{ and } K_\tau = \frac{\tau}{t},$$

where $\lambda_I$ denotes the disintegration rate of iodine,
$\sigma_X$ is the capture cross section of xenon,
$\phi$ is the neutron flux in the reactor,
$\lambda_X$ is the xenon disintegration constant,
$t$ equals real time and
$\tau$ represents simulator time.

References Cited in the file of this patent

UNITED STATES PATENTS 2,894,688    Robinson _____ July 14, 1959

OTHER REFERENCES

Review of Scientific Instruments (Brownell et al.) August 1953, pages 704–710.

Journal of the Franklin Institute (Stubbs), June 1957, pages 559–561.

Proc. of the IEE (MacLusky), September 1957, vol. 104, No. 17, part B, pages 433–442.

Instruments & Automation (Lewis), April 1958, pages 644–647.